F. E. WEAVER.
SEED CORN STRINGER.
APPLICATION FILED DEC. 31, 1909.
1,028,645.
Patented June 4, 1912.
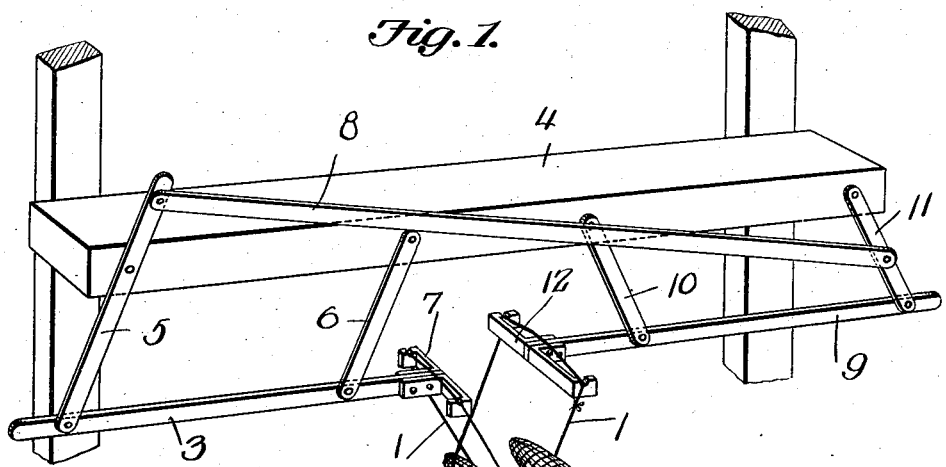
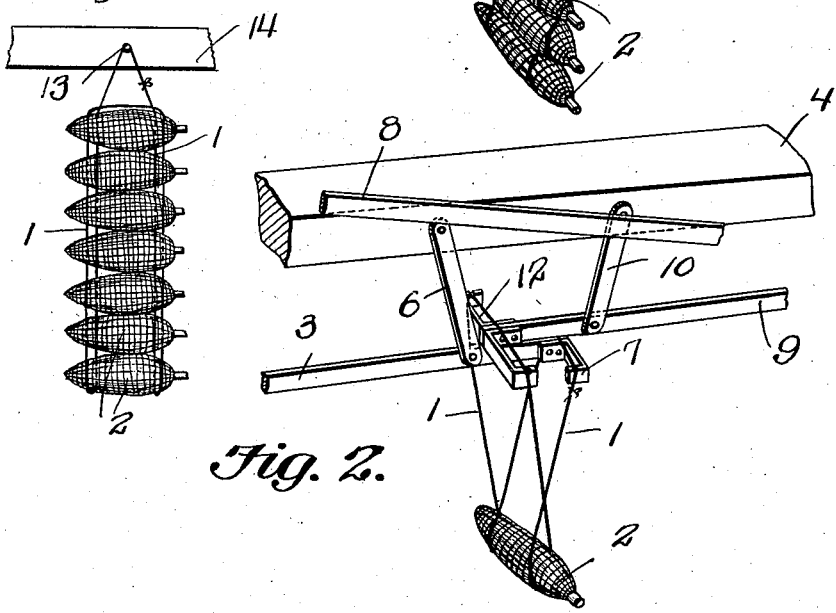
Witnesses
Chas. C. Richardson.
V. B. Hillyard.
Inventor
Frank E. Weaver,
By Victor J. Evans
Attorney

UNITED STATES PATENT OFFICE.

FRANK E. WEAVER, OF CORNING, IOWA.

SEED-CORN STRINGER.

1,028,645.  Specification of Letters Patent.  Patented June 4, 1912.

Application filed December 31, 1909. Serial No. 535,802.

*To all whom it may concern:*

Be it known that I, FRANK E. WEAVER, a citizen of the United States, residing at Corning, in the county of Adams and State of Iowa, have invented new and useful Improvements in Seed-Corn Stringers, of which the following is a specification.

This invention provides for suspending seed corn during the process of curing or after the same has been ripened so as to prevent deterioration from dampness or other cause where the same would be stowed away in close confinement.

The invention provides means whereby the suspending strands may be repeatedly used and whereby said strands may be easily crossed after each ear of corn has been placed in position, thereby enabling the operation to be quickly and conveniently performed.

The invention contemplates a mechanism embodying strands between which the ears of corn are placed and secured by alternately crossing the strands, as in the process of weaving, said strands being carried by oppositely disposed members which are supported in a manner to admit of their simultaneous movement in opposite directions, said members being of such construction as to admit of the strands passing by one another during the process of weaving the same about the ears of corn as the latter are placed in position.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a perspective view of a seed corn stringer embodying the invention. Fig. 2 is a detail view, showing an ear of corn in position and the strands crossed over the same preliminary to receiving the next ear. Fig. 3 is a view in elevation of a string of corn suspended from a rafter.

Corresponding and like parts are referred to in the following description, and indicated in both views of the drawing, by the same reference characters.

The numeral 1 designates a series of strands which are woven so as to secure the ears of corn 2 about as indicated in Fig. 1. The strands 1 may be parts of a single cord of any length and of any desired material, binder twine generally being employed. The cord being arranged to form a loop and having its ends knotted, and the looped cord when in position forming two side loops, the strands of which are arranged so as to engage with opposite end portions of the ears of corn to be suspended.

The suspending and operating means for the strands comprise oppositely disposed members arranged horizontally and mounted to swing simultaneously in opposite directions, whereby the ends of the strands are caused to cross and recross as in the process of weaving, whereby the ears of corn 2 are secured between the strands, as indicated most clearly in Fig. 1. Each of the members consists of a horizontal bar and suspending links. The bar 3 is suspended from an overhead support 4 by means of links 5 and 6 and is provided at one end with a cross head 7. The link 5 is extended upwardly and a bar 8 is pivoted thereto. The other member comprises a bar 9 and suspending links 10 and 11, the bar 8 being pivoted to the link 11 at a distance below the point of suspension equal to the distance of the point of connection of said bar 8 with the link 5 above the pivot connection of said link 5 with the support 4. The support 4 may consist of a bar or timber and is arranged so as to parallel the bars 3 and 9. The links 5 and 6 have a parallel arrangement and incline in an opposite direction to the links 10 and 11, the latter links also having a parallel arrangement.

From the foregoing taken in connection with the drawing it will be understood that each member has a parallelogrammatic movement, with the result that the bars 3 and 9 always remain parallel to a given position at all stages in their movements, and by reason of the arrangement of the connecting bar 8, it will be understood that the bars 3 and 9 have a simultaneous movement in opposite directions, that is the bars 3 and 9 advance simultaneously or separate synchronously. The bar 9 is provided at its inner end with a cross head 12, which parallels the cross head 7 and is longer than said cross head and in a higher plane, thereby enabling the cross head 7 to pass beneath the cross head 12 in the operation of the appliance. The strand 1 is hung over the cross heads 7 and 12. The strand hanging over the cross head 12 is separated a greater distance than the strand hanging over the cross head 7, hence the end portion of the strand over the cross head 7 passes between the end portion of the strand over the cross head 12 in the operation of the mechanism. In order that the parts 3 and 7 may clear the parts 9 and 12 the latter are in a slightly higher plane.

When the parts are in position the strand 1 assumes the position of loops and an ear of corn is placed in the bights or folds of the strands, after which the members of the mechanism are moved to cause the strands to cross above said ear preliminary to placing a second ear in position, after which the strand crossing-members are again operated to bring the upper ends of the strands back into normal position, thereby crossing the same over the second ear preliminary to placing the third ear in position. This operation is repeated, the strands being crossed after each ear is placed in position, with the result that the ears are secured between the strands by having the latter woven therearound, as clearly indicated in Fig. 1. It will thus be understood that the strands may be repeatedly used and the ears may be released when desired after having been taken from the machine by simply taking hold of bottom ear in string of ears, and letting top end drop to bottom and the ears will all roll out.

Each of the cross heads 7 and 12 consists of a cross bar having its end portions inwardly bent about at a right angle, the bent ends being formed in their upper edges with notches to receive the parts of the cord or strands extending therefrom. This arrangement prevents slipping of the strands and at the same time enables the string of the ears to be disengaged from the mechanism when completed, so that another string may be placed in position for a repetition of the operation.

After the last ear of corn has been placed in position one end of the cord is passed through the opposite end of the cord and engaged thereby, as indicated most clearly in Fig. 3, the end portion of the cord passing through the opposite end of the cord serving as suspending means. The string of corn thus formed may be suspended from a nail or analogous device 13 driven into a rafter or other supporting means 14.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In an appliance of the character specified the combination of oppositely disposed strand crossing members, pivotally supported suspending links for the strand crossing members, one of the links of one of the members being extended beyond its pivot support, and a bar connecting the extension of said link with one of the links of the other member whereby both strand crossing members are simultaneously operated in opposite directions.

2. An appliance of the character set forth comprising a horizontal support, oppositely disposed horizontal bars provided at their inner ends with cross heads, the latter being of different lengths and said horizontal bars being in different horizontal planes, oppositely inclined links pivotally supporting the horizontal bars, one of the links being extended, and a connecting bar between the extension of said extended link and one of the links of the other horizontal bar to cause said horizontal bars to move simultaneously in opposite directions, said cross heads adapted to support strands which in the operation of the appliance are crossed and recrossed.

In testimony whereof I affix my signature in presence of two witnesses.

FRANK E. WEAVER.

Witnesses:
 C. L. ROGERS,
 E. M. VERNON.